(12) United States Patent  (10) Patent No.: US 8,573,611 B1
Jensen  (45) Date of Patent: Nov. 5, 2013

(54) EMERGENCY SAFETY SYSTEM FOR VEHICLES WITH SUPPLEMENTAL AXLES

(71) Applicant: Kenneth D. Jensen, Mobridge, SD (US)

(72) Inventor: Kenneth D. Jensen, Mobridge, SD (US)

(*) Notice: Subject to any disclaimer, the term of this patent is extended or adjusted under 35 U.S.C. 154(b) by 0 days.

(21) Appl. No.: 13/644,034

(22) Filed: Oct. 3, 2012

(51) Int. Cl.
*B62D 61/12* (2006.01)

(52) U.S. Cl.
USPC ........................................... 280/86.5

(58) Field of Classification Search
USPC .......... 280/86.5, 86.75, 86.1; 180/209, 24.02, 180/21
See application file for complete search history.

(56) References Cited

U.S. PATENT DOCUMENTS

| | | | |
|---|---|---|---|
| 4,623,165 A * | 11/1986 | Timmers | 280/86.5 |
| 5,090,495 A | 2/1992 | Christenson | |
| 5,403,031 A | 4/1995 | Gottschalk | |
| 5,549,322 A | 8/1996 | Hauri | |
| 5,823,629 A | 10/1998 | Smith | |
| 6,371,227 B2 | 4/2002 | Bartlett | |
| 6,948,726 B2 | 9/2005 | Dodd | |
| 7,731,208 B2 | 6/2010 | Strong | |
| 2009/0205883 A1 | 8/2009 | Strong | |
| 2009/0205885 A1 | 8/2009 | Strong | |
| 2010/0133771 A1 | 6/2010 | Hudson | |
| 2012/0150394 A1 | 6/2012 | Schwindaman | |

\* cited by examiner

*Primary Examiner* — Faye M. Fleming

(74) *Attorney, Agent, or Firm* — Jeffrey A. Proehl; Woods, Fuller, Schultz & Smith, PC

(57) ABSTRACT

An emergency axle lift control for a vehicle having at least one supplemental load axle configured to provide supplemental support to the vehicle by moving from a stored position in which wheels of the supplemental load axle do not contact the ground surface to a deployed position in which the wheels of the supplemental load axle contact the ground surface. The emergency axle lift control may comprise a control bypass switch operable by an operator of the vehicle while driving the vehicle, with the control bypass switch being configured to cause all of the supplemental load axles of the vehicle to move from the deployed position toward the stored position when the operator actuates the control bypass switch.

17 Claims, 2 Drawing Sheets

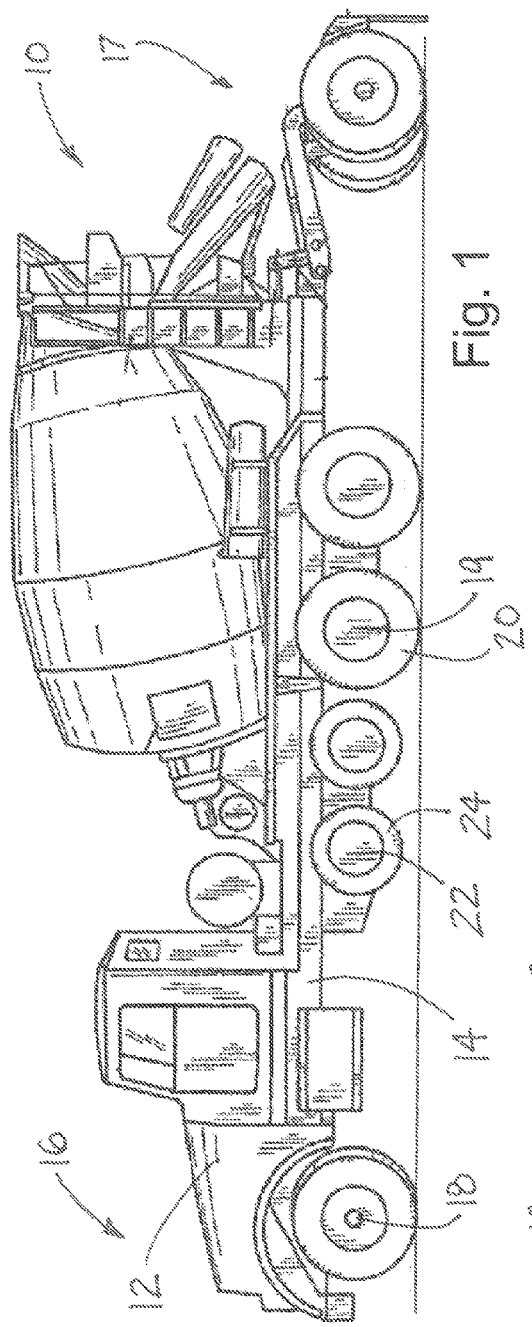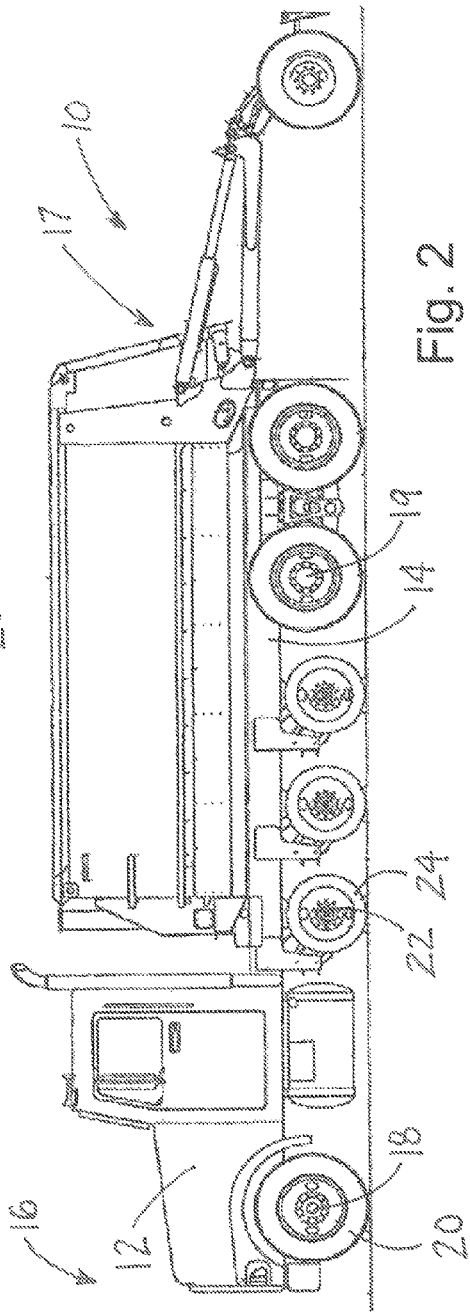

EMERGENCY SAFETY SYSTEM FOR VEHICLES WITH SUPPLEMENTAL AXLES

BACKGROUND

1. Field

The present disclosure relates to vehicle axle control systems and more particularly pertains to a new emergency safety system for vehicles with supplemental axles for assisting the operator in retaining control of the vehicle when a tire on one of the supplemental load axles fails.

2. Description of the Prior Art

Trucks that carry large loads may employ supplemental axles, sometimes referred to as lift, airlift or drop axles, that are not continuously used to support the vehicle on the ground and that are positioned as pusher or tag axles. The supplemental axles are typically raised and lowered by mechanical or pneumatic means in response to operator control input. Heavy tucks, such as dump trucks and ready mix concrete trucks often utilize multiple supplemental axles in pusher and tag locations, and each of the supplemental axles is individually controllable to provide a variable amount of supplemental support depending upon the weight of the load being carried at any one time and the desired reduction in load per axle.

SUMMARY

In one aspect, the disclosure relates to a system comprising a vehicle including a frame with a front and a rear, at least two support axles mounted on the frame and including at least a pair of wheels per support axle, and at least one supplemental load axle mounted on the frame and including at least two wheels per supplemental load axle configured to selectively contact the ground surface below the vehicle to provide supplemental support to the frame. The at least one supplemental load axle may be moveable between a deployed position in which the wheels of the supplemental load axle contact the ground surface and a stored position in which the wheels do not contact the ground surface. The system may also include an axle actuation apparatus configured to selectively move the at least one supplemental load axle between the stored position and the deployed position, with one of the axle actuation apparatus being provided to move each one of the at least one supplemental load axles. The system may further include a primary control assembly configured to control the axle actuation apparatus, with a said primary control assembly being provided for each said axle actuation apparatus. The primary control assembly may comprise a control switch connected to a power source and to the axle actuation apparatus to selectively control supply of power to the axle actuation apparatus to operate the actuation apparatus to move the at least one supplemental load axle from the stored position to the deployed position and from the deployed position to the stored position. The system may still further include an emergency axle lift control configured to cause all of the supplemental load axles on the vehicle to be moved from the deployed position toward the stored position, with the emergency axle lift control comprising a control bypass switch operable by an operator of the vehicle while driving the vehicle and configured to cause all of the supplemental load axles of the vehicle to move from the deployed position toward the stored position when the operator actuates the control bypass switch.

In another aspect, the disclosure relates to an emergency axle lift control for a vehicle having at least one supplemental load axle configured to provide supplemental support to the vehicle by moving from a stored position in which wheels of the supplemental load axle do not contact the ground surface to a deployed position in which the wheels of the supplemental load axle contact the ground surface. The emergency axle lift control may comprise a control bypass switch operable by an operator of the vehicle while driving the vehicle, with the control bypass switch being configured to cause all of the supplemental load axles of the vehicle to move from the deployed position toward the stored position when the operator actuates the control bypass switch.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 1 is a schematic side view of a vehicle including aspects of a new emergency safety system for vehicles with supplemental axles according to the present disclosure, showing some of the supplemental axles in a stored position.

FIG. 2 is a schematic side view of a vehicle with the system according to an illustrative embodiment, showing some of the supplemental axles in a deployed position.

DETAILED DESCRIPTION

Figure 3:
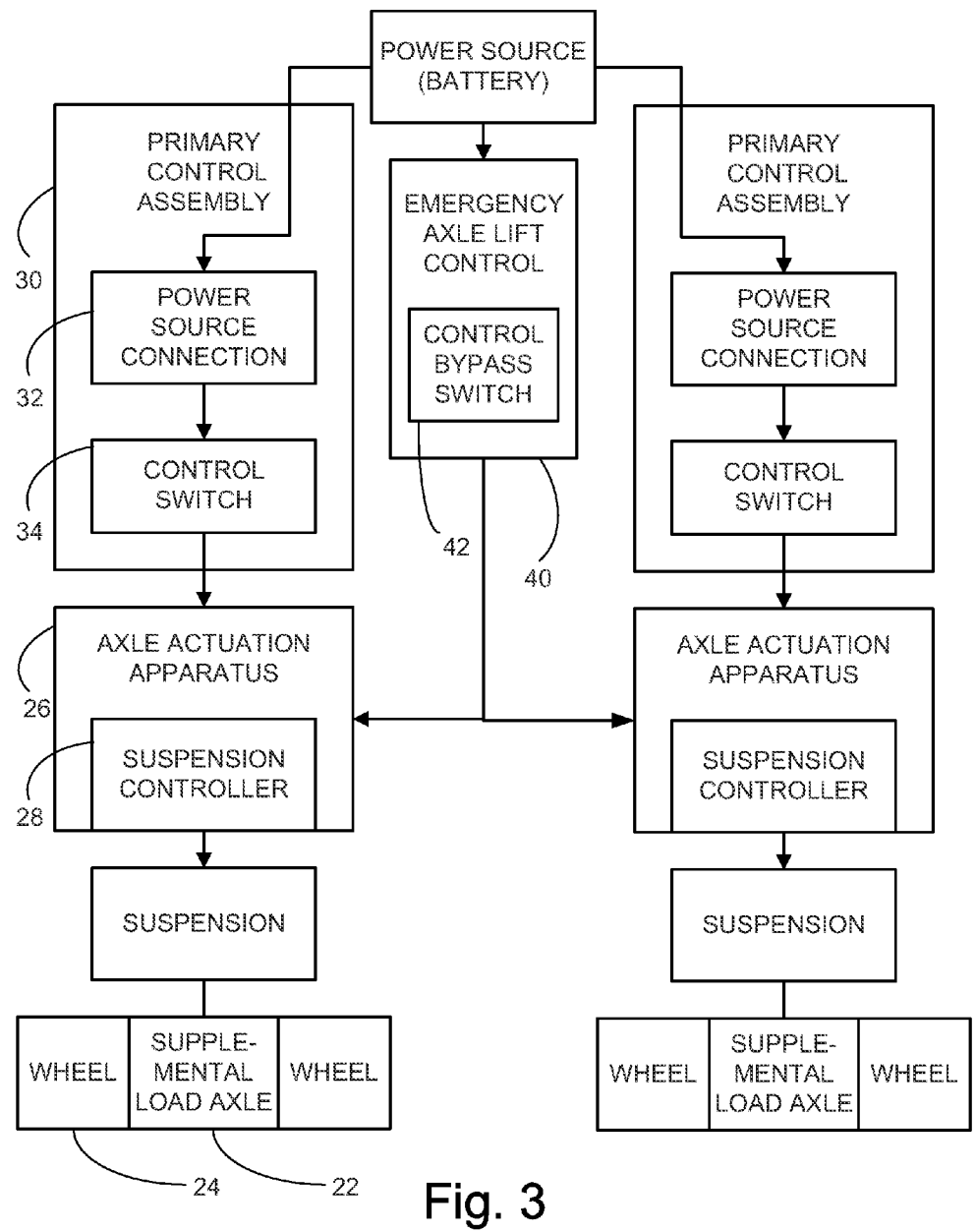
FIG. 3 is a schematic block diagram of elements of the system, according to an illustrative embodiment, and particularly showing a pair of the supplemental load axles being controlled by the emergency axle lift control of the disclosure.

With reference now to the drawings, and in particular to FIGS. 1 through 3 thereof, a new emergency safety system for vehicles with supplemental axles embodying the principles and concepts of the disclosed subject matter will be described.

Applicant has recognized that supplemental or lift axles, while critical to the ability of trucks to carry heavy loads, can make the same truck extremely difficult to control when one of the tires of the truck suddenly deflates due to a blowout or other failure of the tire, such as when the tire loses a tread "cap.". The loss of control caused by a tire failure with the supplemental axles deployed may lead to the operator of the truck being unable to keep the truck from entering a ditch alongside the road being traveled, and resulting in a rollover of the vehicle due to the heavy load being carried. Thus, applicant has further recognized that it is desirable, when a tire failure occurs, to lift the supplemental axles and the wheels thereon out of contact with the ground as soon as possible in order to maintain or regain control of the vehicle.

Applicant has also recognized that the typical controls that are utilized to move the axles between the deployed and retracted conditions are difficult to operate quickly in a panic situation to retract all of the deployed axles at the same time. The operator typically has a very short amount of time, after realizing that a tire has been compromised, before he or she may be begin to lose control of the vehicle, and quickly getting the axles retracted can be a matter of life and death for the operator. Further, in some cases the controls for the axles may not be located in the cab of the vehicle at all, as some jurisdictions may require that the controls for the axles be located outside of the vehicle cab to discourage raising of the axles when the vehicle is moving down the road and the axles should be bearing vehicle weight on the road.

Applicant has devised a means of achieving the retraction of all of the deployed axles in a quick manner that avoids the complexity and delays inherent in operating the existing systems.

In some embodiments of the disclosure, a system 10 includes a vehicle 12 which is typically configured to carry loads of significant weight, such that the overall weight of the vehicle may be significantly increased by loading the vehicle and may exceed road axle load limits if the configuration of the vehicle is not changed from the unloaded condition. The vehicle 12 may include a frame 14 with a front 18 and a rear 19, and may include, for example, a dump body or a concrete mixing drum, mounted on the frame toward the rear. The vehicle 12 may also include at least two support axles 18, 19 mounted on the frame, and one of the support axles may be a steering axle located toward the front 16 of the frame and a drive axle located toward the rear 17 of the frame. Each of the support axles may include at least a pair of wheels 20 that are configured and mounted on the frame to remain in contact with the ground surface below the vehicle at all times when the vehicle is supported on the ground surface.

The vehicle 12 may include at least one supplemental load axle 22 that is mounted on the frame, and includes at least two wheels 24 that are configured to selectively contact the ground surface below the vehicle to provide supplemental support to the frame to distribute the weight of the vehicle and load over more wheels (and contact patches) to reduce axle weight. More than one supplemental load axle may be employed, including those configured as pusher axles as well as tag axles and other axle configurations. At least one of the supplemental load axles 22 may be moveable between a deployed position (see FIG. 2) in which the wheels of the supplemental load axle contact the ground surface and a stored position (see FIG. 1) in which the wheels do not contact the ground surface. Typically the supplemental load axles are deployed depending upon the weight of the load being carried, and the need to distribute the weight of the vehicle and the load over more axles and wheels than the vehicle employs unloaded in order to meet road weight restrictions.

The vehicle 12 of the system may also include an axle actuation apparatus 26 that is configured to selectively move the wheels 24 of one of the supplemental load axles 22 between the stored position and the deployed position, and is normally capable of causing the movement of the axle from the stored position to the deployed position, and from the deployed position to the stored position. Such apparatus is typically provided by the vehicle manufacturer or the manufacturer of the supplemental load axle. One of the axle actuation apparatus 26 may be provided to move a particular one of the supplemental load axles, such that the supplemental load axles may be deployed and thus utilized separately depending upon the load conditions necessitating the use of supplemental support. The axle actuation apparatus 26 may include a suspension controller 28 for controlling a condition of the suspension of the vehicle that is employed to mount and support one of the supplemental load axles on the vehicle. The suspension of the vehicle may be movable between an extended condition that generally corresponds to the deployed position of the corresponding supplemental load axle and a retracted condition that generally corresponds to the stored position of the supplemental load axle. The suspension structure utilized to cause this transition between conditions, and the corresponding movement of the axle between the positions, may be of any suitable configuration. For example, many popular suspension structures utilize pneumatic systems of air bags or bellows. In other implementations, the suspension structures may be mechanically-, hydraulically-, or electrically-actuated, although other systems may be employed.

The vehicle may also comprise a primary control assembly 30 that is configured to control the axle actuation apparatus 26 based upon input from the operator of the vehicle. A primary control assembly 30 may be provided for each axle actuation apparatus 26 so that the operator is able to operate each of the supplemental load axles independently. The primary control assembly 30 may comprise a power source connection 32 that may include a fuse or fusible link that is configured to control an over current condition in the power source connection and thus the axle actuation apparatus 26. The power source connection 32 may be connected to a power source, which is typically a battery of the vehicle. The primary control assembly 30 may further comprise a control switch 34 that is connected to the power source connection 32 and to the axle actuation apparatus 26. The control switch 34 is operable by the operator of the vehicle to selectively control supply of power to the axle actuation apparatus to operate the actuation apparatus and move the supplemental load axles between the stored position and the deployed position.

The control switch 34 may be configured to cause the movement of one of the supplemental load axles from the stored position to the deployed position and from the deployed position to the stored position, and may be a single switch with double throws, such that movement in one direction deploys the axle and movement in the other direction stores the axle, or a pair of switches. The operator is thus able to cause both movements using the control switch 34, and the switch may permit some decree of adjustability of the pressure that the suspension applies to the supplemental load axle to provide an adjustable degree of supplemental load carrying ability.

A significant aspect of the system 10 is the emergency axle lift control 40 that is configured to cause at least one supplemental load axle 22 on the vehicle to be moved from the deployed position to the stored position, and in the most preferred embodiments the control 40 is configured to move all of the supplemental load axles on the vehicle toward the stored position in a substantially simultaneous manner so that the operator does not have to operate multiple switches to provide the simultaneous movement of the axles 22 (see, for example, FIG. 3). It is note that one of the primary purposes may be to take the wheels of the supplemental load axles out of contact with the ground surface, so it is not critical that the supplemental load axles actually achieve the stored position upon the activation of the emergency axle lift control 40. Also in the most preferred embodiments, the emergency axle lift control is incapable of causing the supplemental load axle to be moved from the stored position to the deployed position, as the control 40 is intended for use in emergency situations only and not for normal, non-emergency conditions. The emergency axle lift control 40 may bypass the primary control assembly 30, and may be connected in parallel with the primary control assembly to form the bypass. The emergency axle lift control 40 may be connected to a power source, such as the battery of the vehicle, without having fuse overcurrent protection as the draw of power from the battery may exceed the normal desirable limits for current which may be an acceptable risk for avoiding the effects of a blown tire on vehicle handling.

The emergency axle lift control 40 may include a control bypass switch 42 that is configured to be actuated by the operator of the vehicle, and may be located for easy access by the operator in an emergency or panic situation for the operator. The control bypass switch 42 may be, for example, mounted on a dash or instrument panel of the vehicle to be operable by the operator when seated in the vehicle cab in a simple manner when the need arises, such as by pressing or hitting the control. The switch 42 may thus be formed by a button or plunger that is pressed in a simple movement. In some embodiments, the control bypass switch may be a momentary switch that does not require a prolonged actuation to keep power flowing from the power source to the axle actuation apparatus until the supplemental load axle moves from the deployed position to the stored position. Use of a momentary type switch may require additional circuitry to maintain power flow to the axle actuation apparatus until the supplemental load axles are moved completely to the stored position, or at least until the wheels 24 of the axles 22 are moved out of contact with the road surface as that is a primary objective of the system.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system comprising:
a vehicle comprising:
   a frame with a front and a rear,
   at least two support axles mounted on the frame and including at least a pair of wheels per support axle;
   at least one supplemental load axle mounted on the frame and including at least two wheels per supplemental load axle configured to selectively contact the ground surface below the vehicle to provide supplemental support to the frame, the at least one supplemental load axle being moveable between a deployed position in which the wheels of the supplemental load axle contact the ground surface and a stored position in which the wheels do not contact the ground surface;
   an axle actuation apparatus configured to selectively move the at least one supplemental load axle between the stored position and the deployed position, a said axle actuation apparatus being provided to move each one of the at least one supplemental load axles;
   a primary control assembly configured to control the axle actuation apparatus, a said primary control assembly being provided for each said axle actuation apparatus, the primary control assembly comprising a control switch connected to a power source and to the axle actuation apparatus to selectively control supply of power to the axle actuation apparatus to operate the actuation apparatus to move the at least one supplemental load axle from the stored position to the deployed position and from the deployed position to the stored position; and
   an emergency axle lift control configured to cause all of the supplemental load axles on the vehicle to be moved from the deployed position toward the stored position, the emergency axle lift control comprising a control bypass switch operable by an operator of the vehicle while driving the vehicle and configured to cause all of the supplemental load axles of the vehicle to move from the deployed position toward the stored position when the operator actuates the control bypass switch.

2. The system of claim 1 wherein the emergency axle lift control bypasses the primary control assembly to operate the axle actuation apparatus.

3. The system of claim 1 wherein the emergency axle lift control is incapable of causing the at least one supplemental load axle to move from the stored position to the deployed position.

4. The system of claim 1 wherein the emergency axle lift control is configured parallel to the primary control assembly.

5. The system of claim 1 wherein the emergency axle lift control is connected to a battery of the vehicle without fuse overcurrent protection.

6. The system of claim 1 wherein the control bypass switch is mounted on a dash of the vehicle to be operable by the operator when seated in a cab of the vehicle.

7. The system of claim 6 wherein the primary control assembly further comprises a power source connection including a fuse configured to control an over current condition in the power source connection and the axle actuation apparatus, the power source connection being connected to a battery of the vehicle.

8. An emergency axle lift control for a vehicle having at least one supplemental load axle configured to provide supplemental support to the vehicle by moving from a stored position in which wheels of the supplemental load axle do not contact the ground surface to a deployed position in which the wheels of the supplemental load axle contact the ground surface, the emergency axle lift control comprising:
   a control bypass switch operable by an operator of the vehicle while driving the vehicle, the control bypass switch being configured to cause all of the supplemental load axles of the vehicle to move from the deployed position toward the stored position when the operator actuates the control bypass switch;

wherein the control bypass switch is connected to a battery of the vehicle without fuse overcurrent protection.

9. An emergency axle lift control for a vehicle having at least one supplemental load axle configured to provide supplemental support to the vehicle by moving from a stored position in which wheels of the supplemental load axle do not contact the ground surface to a deployed position in which the wheels of the supplemental load axle contact the ground surface, the emergency axle lift control comprising:

a control bypass switch operable by an operator of the vehicle while driving the vehicle, the control bypass switch being configured to cause all of the supplemental load axles of the vehicle to move from the deployed position toward the stored position when the operator actuates the control bypass switch;

wherein the vehicle includes an axle actuation apparatus configured to selectively move the at least one supplemental load axle between the stored position and the deployed position, a said axle actuation apparatus being provided to move each one of the at least one supplemental load axles, and a primary control assembly configured to control the axle actuation apparatus, a said primary control assembly being provided for each said axle actuation apparatus, the primary control assembly comprising a control switch connected to a power source and to the axle actuation apparatus to selectively control supply of power to the axle actuation apparatus to operate the actuation apparatus to move the at least one supplemental load axle from the stored position to the deployed position and from the deployed position to the stored position; and wherein the control bypass switch bypasses the primary control assembly to operate the axle actuation apparatus.

10. The control of claim 8 wherein the control bypass switch is incapable of causing the at least one supplemental load axle to move from the stored position to the deployed position.

11. The control of claim 9 wherein the control bypass switch is configured parallel to the primary control assembly.

12. The control of claim 1 wherein the control bypass switch is mounted on a dash of the vehicle to be operable by the operator when seated in a cab of the vehicle.

13. An emergency axle lift control for a vehicle having at least one supplemental load axle configured to provide supplemental support to the vehicle by moving from a stored position in which wheels of the supplemental load axle do not contact the ground surface to a deployed position in which the wheels of the supplemental load axle contact the ground surface, the emergency axle lift control comprising:

a control bypass switch operable by an operator of the vehicle while driving the vehicle, the control bypass switch being configured to cause all of the supplemental load axles of the vehicle to move from the deployed position toward the stored position when the operator actuates the control bypass switch;

wherein the control bypass switch is incapable of causing the at least one supplemental load axle to move from the stored position to the deployed position.

14. The control of claim 13 wherein the control bypass switch is connected to a battery of the vehicle without fuse overcurrent protection.

15. The control of claim 13 wherein the control bypass switch is configured parallel to the primary control assembly.

16. The control of claim 13 wherein the control bypass switch is mounted on a dash of the vehicle to be operable by the operator when seated in a cab of the vehicle.

17. The control of claim 14 wherein the vehicle includes an axle actuation apparatus configured to selectively move the at least one supplemental load axle between the stored position and the deployed position, a said axle actuation apparatus being provided to move each one of the at least one supplemental load axles, and a primary control assembly configured to control the axle actuation apparatus, a said primary control assembly being provided for each said axle actuation apparatus, the primary control assembly comprising a control switch connected to a power source and to the axle actuation apparatus to selectively control supply of power to the axle actuation apparatus to operate the actuation apparatus to move the at least one supplemental load axle from the stored position to the deployed position and from the deployed position to the stored position; and wherein the control bypass switch bypasses the primary control assembly to operate the axle actuation apparatus.

* * * * *